(12) United States Patent
Chen et al.

(10) Patent No.: US 6,978,449 B2
(45) Date of Patent: Dec. 20, 2005

(54) COMMAND CONVERSION INTERFACE BETWEEN IMAGE PROVIDER AND IMAGE REQUESTOR

(75) Inventors: Jack Chen, Hsinchu (TW); Jewel Tsai, Hsinchu (TW); Nora Wen, Hsinchu (TW)

(73) Assignee: Mustek Systems Inc., (TW)

( * ) Notice: Subject to any disclaimer, the term of this patent is extended or adjusted under 35 U.S.C. 154(b) by 710 days.

(21) Appl. No.: 09/860,644

(22) Filed: May 21, 2001

(65) Prior Publication Data

US 2004/0015875 A1 Jan. 22, 2004

(51) Int. Cl.[7] ............................................. G06F 9/45
(52) U.S. Cl. ................................................... 717/140
(58) Field of Search ............................... 717/124, 140; 399/81

(56) References Cited

U.S. PATENT DOCUMENTS

| | | | |
|---|---|---|---|
| 5,543,897 A * | 8/1996 | Altrieth, III | 399/81 |
| 6,350,382 B1 * | 2/2002 | Schick | 210/637 |
| 6,385,412 B1 * | 5/2002 | Sadakuni | 399/75 |
| 6,590,593 B1 * | 7/2003 | Robertson et al. | 345/782 |

OTHER PUBLICATIONS

Mustek System Inc, "Scanner User's Guide", Mustek System Inc., http://www.mustek.com/Class/pdf/1200scanner-.pdf, Jan. 1999.*
Mustek System Inc, "VDC-300 User'Manual", Mustek System Inc., http://www.mustek.com/Class/pdf/vdc300.pdf, Jull., 1998.*

* cited by examiner

Primary Examiner—Wei Y. Zhen
(74) Attorney, Agent, or Firm—Lowe Hauptman & Berner, LLP

(57) ABSTRACT

A command conversion interface between an image machine with a plurality of hard keys and an image requestor is disclosed. When the command conversion interface detects and determines the activation of a specific hard key of the image machine, digital image information from the image machine is provided for the image requestor through the command conversion interface to execute a designated task, which has not been built in the image machine. In the command conversion interface, the designated task is interpreted by a destination command script, and the destination command script is processed by a compiler along with the digital image information, then transmitted to the image requestor to execute the task. The relationship between the specific hard key and the designated task refers to a new correlation table of the command conversion interface.

21 Claims, 2 Drawing Sheets

COMMAND CONVERSION INTERFACE BETWEEN IMAGE PROVIDER AND IMAGE REQUESTOR

FIELD OF THE INVENTION

The present invention relates to a command conversion interface, and more particularly to a command conversion interface between a provider and a requester of package information such as image.

BACKGROUND OF THE INVENTION

With the rapid development of information industrial products, e.g. personal computers, a diverse group of peripheral equipment and information processing devices are created. For example, image scanners and digital cameras become more and more popular and advanced, and are expected to be essential to our daily lives some day.

As known to those who are familiar with computers, the peripheral equipment of computers should properly work with corresponding application programs to exhibit the greatest performance. Unfortunately, so far, the peripheral equipment hardware and application program software have been produced by different engineers of different fields. For example, a software engineer does not understand well about the design of the hardware device, so the considerations may be confined when he develops the corresponding software. As results, the hardware device cannot be manipulated as smooth as desired. Therefore, if the hardware-related information can be provided for the software engineer as package information to be directly applied to the application programs, the performance of the hardware device will be improved, and the software design may impart new applications to the hardware device.

SUMMARY OF THE INVENTION

An object of the present invention is to provide a command conversion interface between a package-information machine and a package-information requestor.

Another object of the present invention is to provide a command conversion interface between an image machine and an image requestor.

A first aspect of the present invention relates to a command conversion interface between an image machine with a plurality of hard keys for providing a digital image information and an image requestor for utilizing the digital image information. The command conversion interface includes a new correlation table established for correlating a designated control key of the image machine with a task, which has not been built in the image machine, to be executed; detection means for determining the activation of the designated control key so as to identify the task to be executed according to the new correlation table; a destination command script file for providing a specific destination command script corresponding to the task to be executed; and a compiler for processing and providing the specific destination command script and the digital image information for the image requestor to execute the task.

Preferably, the designated control key is activated by pressing one of the plurality of hard keys or simultaneously pressing at least two of the plurality of hard keys of the image machine.

Preferably, the designated control key, the task to be executed, and the specific destination command script can be added, cancelled and/or edited via a key control editor, a task control editor, and a command editor, respectively.

The detection means may detect a triggering signal from the designated control key to determine the activation of the designated control key. Alternatively, the detection means may scan the designated control key to determine whether the designated control key is activated.

Preferably, the compiler communicates with the image machine via a driver program.

In an embodiment, the image machine includes an image pickup device, e.g. an image scanner or a digital camera. The image requestor includes an application program capable of executing the task. Alternatively, the image requestor includes a web site in Internet.

A second aspect of the present invention relates to a command conversion interface between a package-information machine with a plurality of hard keys for providing a digital package-information and a package-information requestor for utilizing the digital package-information. The command conversion interface includes a new correlation table for correlating hard keys of the package-information machine with corresponding tasks, which have not been built by said package-information machine; detection means for determining the activation of one of the hard keys so as to find out a task to be executed among the corresponding tasks according to the new correlation table; a destination command script file for providing a specific destination command script corresponding to the task to be executed; and a compiler for processing and providing the specific destination command script and the digital package-information for the package-information requestor to execute the task.

In an embodiment, the digital package-information includes digital image information.

Preferably, the detection means detects a triggering signal from the activated one of the hard keys to find out the task to be executed. Alternatively, the detection means scans the hard keys to determine which one of the hard keys is activated.

Preferably, the compiler communicates with the package-information machine via a driver program.

According to a third aspect of the present invention, the command conversion interface includes a destination command script file for providing a specific destination command script corresponding to a task, which has not been built by the package-information machine, to be executed; and a compiler for receiving the specific destination command script in response to the activation of a designated control key of the package-information machine with a plurality of hard keys to convert and process the specific destination command script and the digital package-information to execute the task.

Preferably, the command conversion interface further includes a new correlation table established for correlating the designated control key of the package-information machine with the task to be executed; and detection means for determining the activation of the designated control key so as to identify the task to be executed according to the new correlation table.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
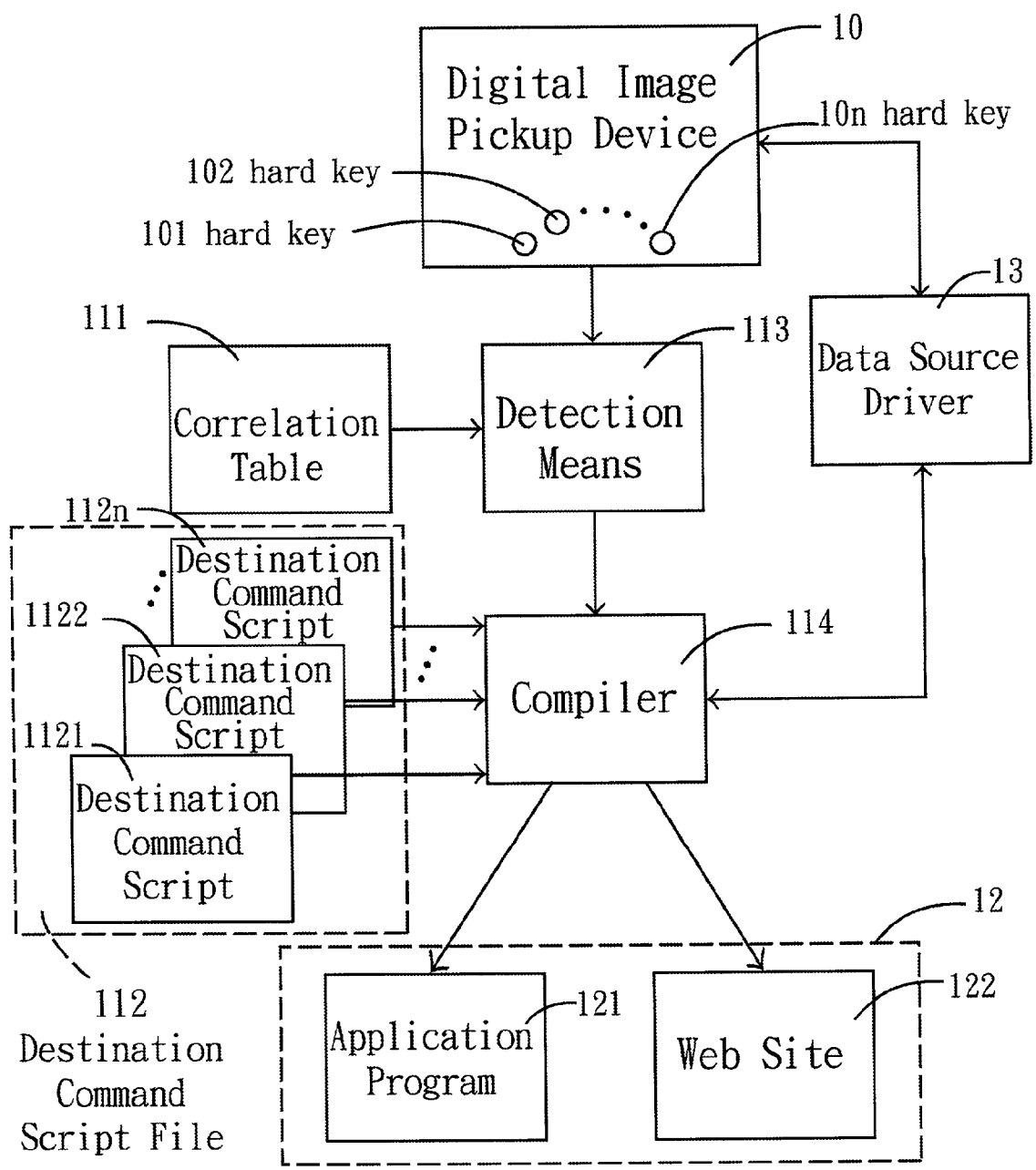
FIG. 1 is a schematic block diagram showing a preferred embodiment of a command conversion interface between an image pickup device and an image requestor according to the present invention.
Figure 2A:
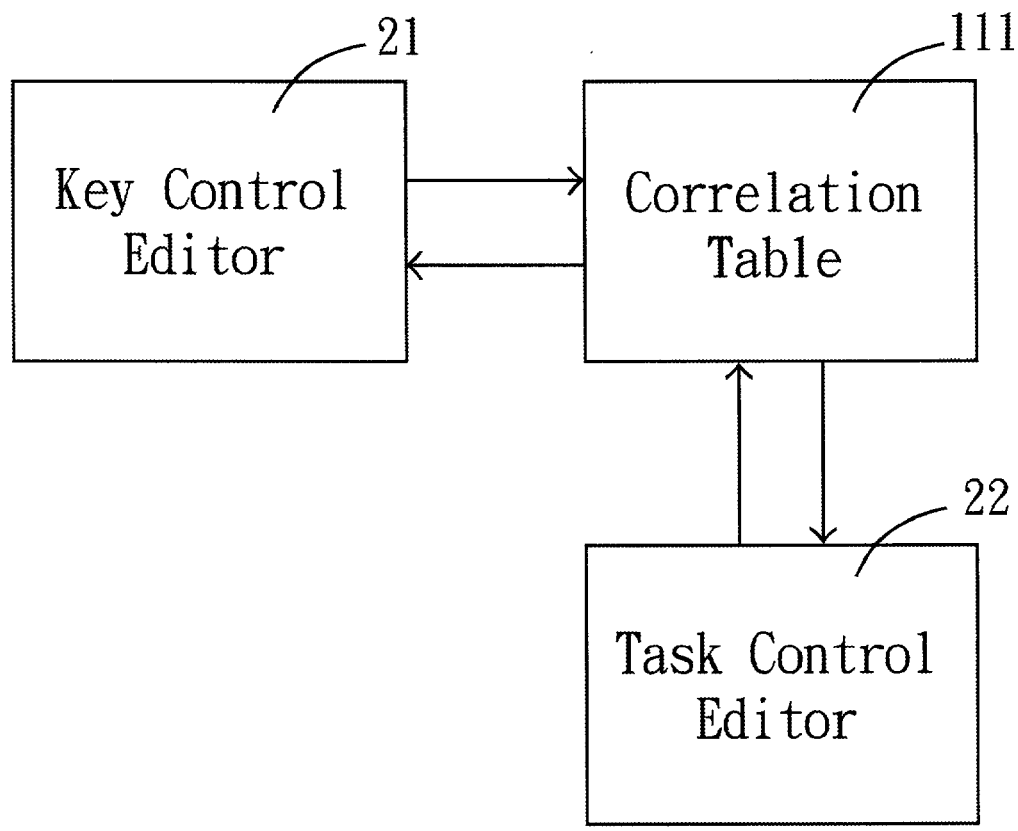
FIG. 2A is a schematic block diagram showing the establishment of the correlation table of FIG. 1.
Figure 2B:
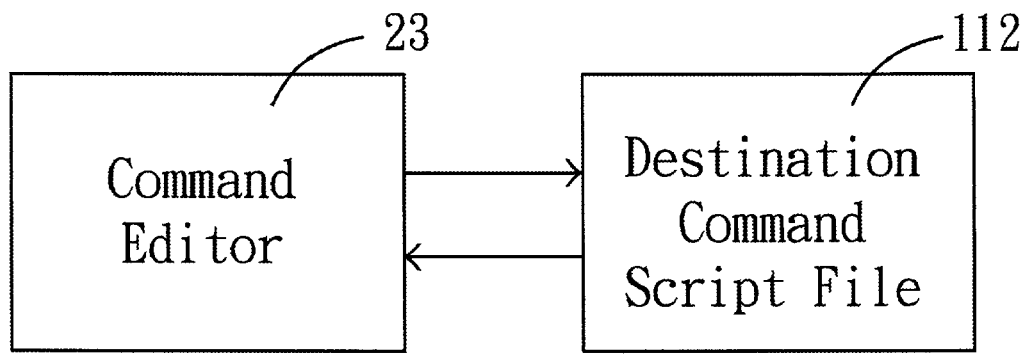
FIG. 2B is a schematic block diagram showing the establishment of the destination command script file.

Please refer to FIG. 1 which is a schematic block diagram showing a preferred embodiment of a command conversion interface between an image pickup device and an image requestor according to the present invention. The command conversion interface includes a correlation table 111, a destination command script file 112 consisting of a plurality of destination command scripts 1121~112n, detection means 113, and a compiler 114. The image pickup device 10 includes a plurality of hard keys 101~10n which are assigned thereto respective tasks via the correlation table 111. The assignment of the hard keys and corresponding tasks is added, cancelled or edited via a key control editor 21 and a task control editor 22 (FIG. 2A). Further, a command editor 23 is used to input the destination command scripts into the destination command script file (FIG. 2B).

When the detection means 113 detects and determines one of the hard keys 101~10n is pressed or actuated in any suitable way, the actuated hard key serves as a control key to specify a task corresponding to the control key according to the correlation table 111. According to the designated task to be executed, a corresponding one of the destination command scripts 1121~112n in the destination command script file 112 is inputted into the compiler 114. Meanwhile, the image pickup device 10 performs an image pickup operation to obtain digital image information of an object, and outputs the digital image information to the compiler 114 via a data source driver 13. The compiler 114 receives the digital image information and the specific destination command script corresponding to the actuated hard key, and converts, processes, and outputs the received information so as to apply the image of the object to an image requester 12. The image requester 12, for example, may include an application program 121 and/or a web site 122 in Internet. It is to be noted that, if necessary, it is also possible to actuate a control key by simultaneously pressing two or more hard keys to perform a function different from that performed by a single hard key.

The image pickup device 10 can be a digital image scanner or a digital camera which picks the image data of an object and converts the image data into digital image information. For example, when the image pickup device is a digital image scanner with at least ten hard keys, ten tasks can be assigned to the ten hard keys, e.g. "Scan-N-Open", "Scan-N-Save", "Quick Copy", "Advanced Copy", "Fax", "E-mail", "OCR-N-Open", "OCR-N-Save", "Activate Software Panel", and "Scan to Web". Preferably, the ten tasks are built in the image scanner, and additional hard keys are reserved to be assigned thereto new tasks by the image requester. The image requestor utilizes the command format required by the command conversion interface to write destination command scripts each corresponding to a designated task.

In this embodiment, the detection means 112 passively detects a triggering signal from one of the control keys to determine the activation of the designated control key. Alternatively, the detection means actively scans all the control keys to determine whether and which control key is activated.

According to the embodiment described above, an example is given as follows to make those skilled in the art understand more about the invention. The image provider is a digital image scanner, the image requestor is a game software program, and a task of "Replace Role's Head" is to be executed. Therefore, first of all, one of the hard keys of the image scanner is assigned thereto a task of "Replace Role's Head" by editing the correlation table (FIG. 2A). The software designer of the game software program then utilizes the command editor to write proper destination command scripts which are acceptable by the compiler to constitute a destination command script file (FIG. 2B). For example, the destination command script file includes scripts of:

Open Application Program;
Execute "Create Game";
Execute "Select"; and
Execute "Replace Head".

When the detection means determines the activation of the control key corresponding to the task of "Replace Role's Head" via the correlation table, the task is outputted to the compiler so that the compiler reads a destination command script corresponding to the task thereinto. Meanwhile, the image scanner scans a photograph to obtain head image information which is also transmitted to the compiler. After the conversion and processing of the compiler, the destination command script and the digital image information are interpreted into executable program codes, and transmitted to the game software program to be executed, i.e. to replace the head of a specified role in the game into the scanned image.

In addition to the application program, the image requestor can also be a web site in the Internet. By using the command conversion interface of the present invention in a similar way as mentioned above, the website designer is allowed to make use of the images obtained by the image scanner easily and conveniently.

From the above description, it is understood that the present invention provides an easy and convenient interface for software and/or website designers to facilitate the integration of information processing device, e.g. information appliance or computer peripheral, and application destination, e.g. application program or web site. Therefore, a series of operations of the information processing device and application destination can be changed or modified as desired by properly defining the hard keys of the information processing device via the present interface. Further, the command conversion interface according to the present invention can be optionally accomplished by software or hardware means.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A command conversion interface between an image machine with a plurality of hard keys for providing a digital image information and an image requestor for utilizing said digital image information, and said command conversion interface comprising:
a new correlation table established for correlating a designated control key of said image machine with a task, which has not been built in said image machine, to be executed;
detection means for determining the activation of said designated control key so as to identify said task to be executed according to said new correlation table;
a destination command script file for providing a specific destination command script corresponding to said task to be executed; and
a compiler for processing and providing said specific destination command script and said digital image information for said image requestor to execute said task.

2. The command conversion interface according to claim 1 wherein said designated control key is activated by pressing one of said plurality of hard keys of said image machine.

3. The command conversion interface according to claim 1 wherein said designated control key is activated by simultaneously pressing at least two of said plurality of hard keys of said image machine.

4. The command conversion interface according to claim 1 wherein said designated control key and said task to be executed are inputted into said new correlation table via a key control editor and a task control editor, respectively.

5. The command conversion interface according to claim 1 wherein said specific destination command script is inputted into said destination command script file via a command editor.

6. The command conversion interface according to claim 1 wherein said detection means detects a triggering signal from said designated control key to determine the activation of said designated control key.

7. The command conversion interface according to claim 1 wherein said detection means scans said designated control key to determine whether said designated control key is activated.

8. The command conversion interface according to claim 1 wherein said compiler communicates with said image machine via a driver program.

9. The command conversion interface according to claim 1 wherein said image machine includes an image pickup device.

10. The command conversion interface according to claim 9 wherein said image pickup device is an image scanner.

11. The command conversion interface according to claim 9 wherein said image pickup device is a digital camera.

12. The command conversion interface according to claim 1 wherein said image requestor includes an application program capable of executing said task.

13. The command conversion interface according to claim 12 wherein said image requestor includes a web site in Internet.

14. A command conversion interface between a package-information machine with a plurality of hard keys for providing a digital package-information and a package-information requestor for utilizing said digital package-information, and said command conversion interface comprising:
a new correlation table for correlating said plurality of hard keys of said package-information machine with a plurality of corresponding tasks, which have not been built by said package-information machine;
detection means for determining the activation of one of said plurality of hard keys so as to find out a task to be executed among said plurality of corresponding tasks according to said new correlation table;
a destination command script file for providing a specific destination command script corresponding to said task to be executed; and
a compiler for processing and providing said specific destination command script and said digital package-information for said package-information requestor to execute said task.

15. The command conversion interface according to claim 14 wherein said digital package-information includes digital image information.

16. The command conversion interface according to claim 14 wherein said detection means detects a triggering signal from said activated one of said plurality of hard keys to find out said task to be executed.

17. The command conversion interface according to claim 14 wherein said detection means scans said plurality of hard keys to determine which one of said plurality of hard keys is activated.

18. The command conversion interface according to claim 14 wherein said compiler communicates with said package-information machine via a driver program.

19. A command conversion interface between a package-information machine with a plurality of hard keys for providing a digital package-information and a package-information requestor for utilizing said digital package-information, and said command conversion interface comprising:
a destination command script file for providing a specific destination command script corresponding to a task, which has not been built by said package-information machine, to be executed; and
a compiler for receiving said specific destination command script in response to the activation of a designated control key of said package-information machine to convert and process said specific destination command script and said digital package-information to execute said task; a new correlation table established for correlating said designated control key of said package-information machine with said task to be executed; and detection means for determining the activation of said designated control key so as to identify said task to be executed according to said new correlation table.

20. The command conversion interface according to claim 19 wherein said detection means detects a triggering signal from said designated control key to determine the activation of said designated control key.

21. The command conversion interface according to claim 19 wherein said detection means scans said designated control key to determine whether said designated control key is activated.

* * * * *